United States Patent [19]

Kniss et al.

[11] Patent Number: 4,556,039
[45] Date of Patent: Dec. 3, 1985

[54] METHOD AND APPARATUS FOR ADAPTING AND CONTROLLING THE EXHAUST GAS CIRCULATION RATE

[75] Inventors: Helmut Kniss, Waiblingen; Johannes Locher, Stuttgart, both of Fed. Rep. of Germany

[73] Assignee: Robert Bosch GmbH, Stuttgart, Fed. Rep. of Germany

[21] Appl. No.: 522,763

[22] Filed: Aug. 12, 1983

[30] Foreign Application Priority Data

Oct. 23, 1982 [DE] Fed. Rep. of Germany ....... 3239287

[51] Int. Cl.$^4$ .............................................. F02D 21/08
[52] U.S. Cl. ..................................... 123/569; 123/571
[58] Field of Search ................................ 123/569, 571

[56] References Cited

U.S. PATENT DOCUMENTS

| | | | |
|---|---|---|---|
| 4,181,944 | 1/1980 | Yamauchi et al. | 123/569 |
| 4,333,440 | 6/1982 | Eheim | 123/569 |
| 4,373,497 | 2/1983 | Hamren | 123/569 |
| 4,411,242 | 10/1983 | Igashira et al. | 123/569 |

*Primary Examiner*—Parshotam S. Lall
*Assistant Examiner*—W. R. Wolfe
*Attorney, Agent, or Firm*—Edwin E. Greigg

[57] ABSTRACT

A method and an apparatus are proposed for adapting the exhaust gas recirculation rate in internal combustion engines, in particular Diesel engines. In order to prevent the smoke which is produced at first in new engines, or when injection nozzles or the like are replaced, an adjustment is made in the exhaust gas recirculation rate, acting as a supplement to the change in this rate which is conventionally made, the supplementary adjustment being preferably performed in stages and with reference to the function of the duration of operation from the time the varying operating conditions begin. The number of injection events is counted and successive memory locations are triggered at time intervals, effecting an adaptation of the exhaust gas recirculation rate up to the final status, each stage in adaptation being stored permanently in memory as it is attained.

11 Claims, 2 Drawing Figures

METHOD AND APPARATUS FOR ADAPTING AND CONTROLLING THE EXHAUST GAS CIRCULATION RATE

BACKGROUND OF THE INVENTION

The invention is based on a method and an apparatus as generally described. In internal combustion engines, such as Diesel engines, equipped with exhaust gas recirculation systems, it is known to adapt the exhaust gas recirculation rate to prevailing operating conditions, for instance recirculating a greater or lesser proportion of exhaust gas expelled by the Diesel engine depending upon the engine load status. It is thereby possible, for instance, to reduce exhaust gas components which are harmful to health; it is also possible, by regulating the exhaust gas recirculation rate as precisely as possible together with the quantity of fresh air supplied and the quantity of fuel injected, to attain an optimal air excess over the entire operating range of the engine, thereby reducing the oxides of nitrogen and attaining a largely soot-free combustion.

Problems may arise in known exhaust gas recirculation systems of this type if the initial operating conditions change and introduce additional variables into the process, which have to be taken into consideration in establishing the exhaust gas recirculation rate. The nature of such variables is, however, such that over the operating life of the engine their influence on the overall course of combustion and exhaust gas recirculation is extremely strong at first but then drops off gradually.

OBJECT AND SUMMARY OF THE INVENTION

The method and apparatus according to the invention have the advantage over the prior art in that the exhaust gas recirculation rate can be adapted appropriately even to changes in the operating status which occur only once over long periods in operation. For instance, the present invention succeeds in eliminating the well-known production of smoke, which appears initially and then decreases gradually both in new engines and in engines (Diesel engines) equipped with new injection nozzles, injection pumps and the like.

It is particularly advantageous to realize the followup of the exhaust gas recirculation rate over the operating period by the use of memory means which do not lose their contents even if the control unit is shut off, yet which are designed so simply and uncomplicatedly in combination with the overall system that skilled personnel are not required to readjust the adaptation of the exhaust gas recirculation rate, and that such readjustments can readily be performed during routine maintenance and inspection of the vehicle equipped with such engines.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
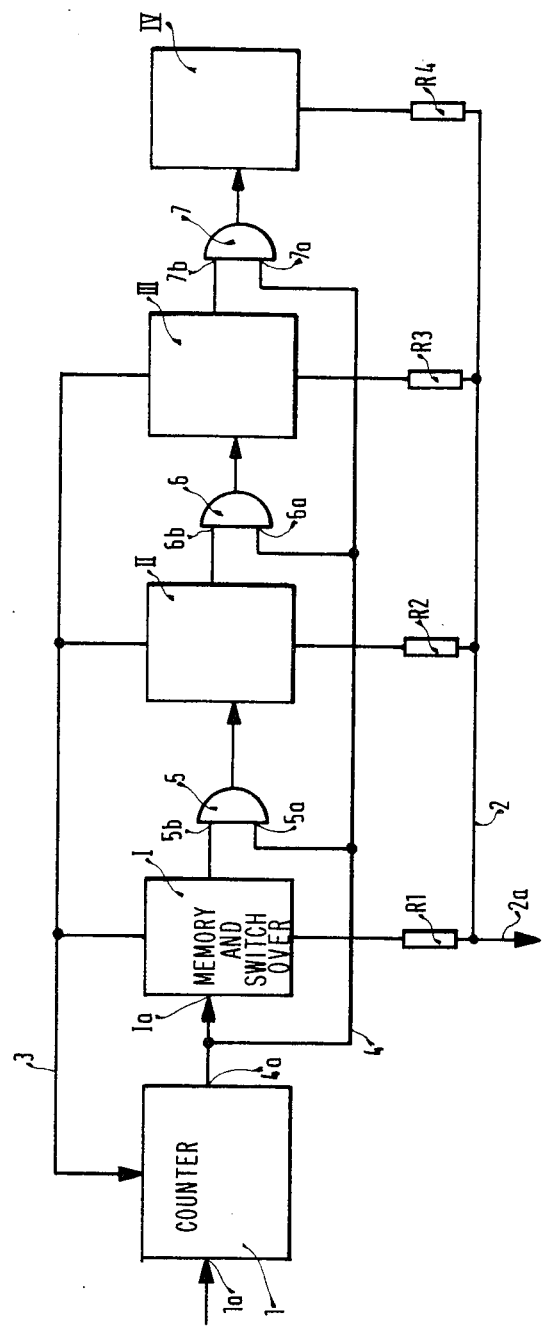
FIG. 1 shows the system according to the invention in the form of a block circuit diagram.

The invention is based on the discovery that the smoke production occurring in new engines, or in engines which have been overhauled by replacing the injection nozzles or other systems having to do with fuel metering, can be traced to the presence of too little oxygen for complete combustion while the rate of exhaust gas recirculation remains the same. As a matter of fact, injection nozzles which have not yet been in service for more than several hours do conventionally inject more fuel than do nozzles which have undergone a run-in period, which in turn can be traced to the fact that these new nozzles are impeded or stopped up by a carbonization process. It will be understood, however, that the invention is applicable to all undesirable influences which occur in association with incomplete combustion in internal combustion engines, and in Diesel engines in particular, and which can be eliminated in accordance with an essential feature of the present invention by providing that the exhaust gas recirculation rate be adjusted, supplementarily to the usual parameters affecting it, with a gradually decreasing tendency as needed, for as long as a time as the new status caused by this one-time change in operating state (for instance, the replacement of the injection nozzles) persists, and in this instance by way of example until such time as the injection nozzles have been run in and have attained their actual operating state as a result of the attendant carbonization.

Thus in the context of the aging of components in general which in this special instance, like the injection nozzles in Diesel engines, effect a gradual change in the variables which represent a standard for overall functioning, it is also a characteristic of the present inventionl not to counter such effects by creating means to compensate for this aging but rather from the outset to presume a certain aging status, which becomes established after a brief run-in time and thereafter remains the same over very long operating periods, and to compensate for any run-in problems which might occur by suitable means, specifically the gradual followup of the exhaust gas recirculation rate while simultaneously storing in memory the followup status attained at a given time.

This followup can be effected continuously, but in a specialized exemplary embodiment it is preferably effected in a graduated manner, so that desired function courses of the extent of intervention into the adjustment of the exhaust gas recirculation rate, which takes place in any event, are realizable without difficulty.

The opportunity for followup of the exhaust gas recirculation rate in Diesel engines to be described now in detail thus represents merely one exemplary embodiment of the present invention for intercepting changes in operating state which occur only once prior to the attainment of an aging status after run-in, and it does not limit the basic concept of the invention to this form of embodiment. Thus in the exemplary embodiment of FIG. 1 for preventing smoke production, for instance when the injection nozzles of a Diesel engine are replaced, the followup of the exhaust gas recirculation rate over the effective operating period in a manner that is graduated ocver time and limited in duration is realized in that an operating time counting device is provided, specifically a counter 1 which detects and adds up the individual injection events. The counter 1 may be a multi-stage electronic counter, which is supplied at its counting input 1a with the usual injection duration pulses of a Diesel engine, which can be derived as counting pulses in a suitable manner from a measurement of injection duration. The injections taking place over the operating time may, for instance in injection systems not already operating on an electronic basis and therefore providing a pulse train which agrees with the individual injection pulses, be detected in that a pressure/voltage converter is provided, which detects the pressure increase in the injection lines and converts it each time into a counting pulse for the counter 1.

It has been established by tests that whenever the production of smoke in Diesel engines can be traced back to the replacement of the injection nozzles, carbonization of such nozzles will, after approximately an hour in operation, have progressed to such an extent that objectionable smoke no longer occurs. The exemplary embodiment shown in FIG. 1 therefore provides that readjustments in the exhaust gas recirculation rate be performed at intervals in sequence representing parts of the total followup period, which in this example is one hour in operation; this is done in that after a predetermined fraction of the total followup period, for instance after one-quarter hour, a provision is made for adjusting and following up the exhaust gas recirculation rate, which as a first step in adaptation to the final status effects a partial change in the exhaust gas recirculation rate. It will be understood, and is within the scope of the invention, that for the duration of the followup the system will be divided into an arbitrary number of stages for adaptation to the final status or if needed, as will be described in greater detail below, that the adaptation will be performed continuously for this period. The essential point, however, is that the adjustment point or stage attained at a given time is stored in memory as an attained state in such a way that even an intervening shutoff of the engine will not erase this information. Thus should the control unit for the injection or for the exhaust gas recirculation, for instance, be shut off, then the stage of adaptation that has been attained will remain in force for the supplementary intervention into the adjustment of the exhaust gas recirculation rate.

In the system shown in FIG. 1, it is apparent that four graduations or stages have been provided, corresponding to a subdivision of the followup period into four time intervals, not necessarily of equal length, which will elapse. The counter 1 is designed such that it generates a signal after a prespecified number of injections, which correspond to the time interval desired at a given time until the next readjustment of the exhaust gas recirculation rate, and switches a first memory location into some different, standard-setting switching status. This first memory or switchover location is marked I in FIG. 1 and after the prespecified number of injections, corresponding for instance to 16,000 pulses for a period in operation of approximately one-quarter hour, this location I receives a control pulse or control signal at its input Ia which acts upon this memory location I in such a way that a switching status is brought about on a common output bus line 2 which is different from the previous status, this new status being weighted if needed by a correction element which may be embodied simply as a weighting resistor R1, if the switchover influences resulting from the various memory locations I–IV are for instance changes in the potential of the bus line 2. At the same time as the switchover effected by the memory location I and the transmission of a corresponding switching signal to the bus line 2 for the sake of the latter's persisting change in potential, the memory location I resets the counter 1 logically to its initial status, doing so by supplying a reset pulse to a reset bus line 3 via a branch, to be more fully explained below, leading to this reset bus line 3.

In accordance with a particularly preferred exemplary embodiment of the present invention, the switchover and storage in memory of the first time interval after the beginning of the exertion of supplementary influence on the exhaust gas recirculation rate are effected in that the memory location I is embodied such that it has a fuse, for instance a small fuse having a prespecified ampere rating of the usual type in motor vehicles, which burns out when the first time interval is attained and the memory circuit responds. An irreversible counting procedure is thus firmly established, and the exertion of influence by the memory location I on the potential of the bus line 2 can be such that the memory location I then precludes itself entirely from influencing the potential of the bus line 2 because of the burning out of its fuse. Initially, the influencing potential of the bus line 2 for adjusting the exhaust gas recirculation rate can thus be at a low level (which causes a major adjustment and exertion of influence), this potential then increasing gradually as a result of the successive burning out of fuses in the memory locations I–IV, because these fuses provide paths of electric current leading to ground which are then successively eliminated. This process will now be described in detail, referring to FIG. 2.

It will be understood that the output signal of the counter 1 intended for the first memory location I cannot be allowed simultaneously to cause a switchover of the other memory locations via the common trigger line 4 from the output 4a of the counter 1; linking circuits, preferable AND gates 5, 6, 7, are therefore included between the various memory locations, assuring that the fuses following the first fuse of the first memory location will burn out one at a time and in sequence so that the exhaust gas recirculation rate is influenced at graduated intervals and at a correspondingly reduced manner over time.

The various AND gates 5, 6, 7 have respective first inputs 5a, 6a, 7a, with which they are connected to the control pulse bus line 4 from the output of the counter 1, and second inputs 5b, 6b, 7b, with which each AND gate 5, 6, 7 is connected to an output of the respective memory locations I–III preceding them and thereby detect the status of these memory locations. The AND linkages 5, 6, 7 are embodied such that they pass through the switchover control pulse from the counter 1 to the respective following memory location II, III, IV only if the particular memory location preceding it has already been switched to its switched over status; in the illustrated exemplary embodiment this corresponds to the state where the fuse has burned out.

The continuous function is then such that whenever the counter has again attained the established counter state, or a predetermined next counter state, the next fuse is burned out, until all the fuses (in the exemplary embodiment shown, four fuses in four memory locations I–IV) have burned out. During the operation of an internal combustion engine (Diesel engine), the following steps are thereby attained:

1. The exhaust gas recirculation rate is altered such as to correspond to the influence of the extent thus far of carbonization of the injection valves;

2. this attained state is stored in memory, specifically in such a manner that even if the control unit is shut off the information will not be lost; and 3. by means of a suitable linking circuit it is assured that the next succeding memory location is prepared for a switchover, or in other words the next fuse is prepared for being burned out.

An adaptation of the exhaust gas recirculation rate is thus effected by making a supplementary intervention into the normal state, which is predetermined by the aged components used, in this instance in four stages, until the final state is reached, with each stage being stored in permanent memory as it is attained.

The use of fuses in the exemplary embodiment of FIG. 1 offers the further advantage that they can be disposed at some suitable location outside the apparatus; thus there is no difficulty in replacing the fuses with new ones as well when installing new injection nozzles, perhaps in the course of an engine inspection, as a result of which the adaptation process is then initiated once more. The invention thus makes it possible to perform an automatic adaptation, by measurement and evaluation of a substitute system variable (namely the number of injection events), to a change in the system which for its part exerts a continuously decreasing influence on the operating state of the engine.

The weighting resistors R1–R4 disposed in the supply lines to the output bus line 2 from the memory locations in FIG. 1 permit an adjustment of the extent of the various corrective steps taken, so that it is possible without further provisions to affect the exhaust gas recirculation rate even with a highly nonlinear course of the adjusting functions. The signal produced at the output 2a of the electronic running time circuit shown in FIG. 2 in any event represents the time function of carbonization correction factor for the sake of a supplementary influencing of conventional exhaust gas recirculation systems in Diesel engines.

Modifications of this circuitry can be realized while remaining within the basic concept of the invention; for instance, the menory locations I–IV (in the case where influence is exerted in stages over the course of time) may be replaced by the individual step positions of a switchover element based on an incremental switching relay, with the individual control pulses required for further switching being likewise generated by a counter detecting the number of injection events and being supplied in sequence to the incremental switching element. Each new switching position then leads to altered voltage conditions, for instance with the aid of a resistance matrix connected to the individual outputs of the switch, these altered conditions acting as a carbonization correction factor to influence the exhaust gas recirculation rate.

Finally, a continuous influence can be exerted on the exhaust gas recirculation rate to reduce smoke production with a form of embodiment which is within the scope of the invention. It is possible to detect the number of injection events by counting technology such that using a low-pass filter arrangement with a prior pulse shaping at an analog memory, for instance a capacitor, a gradually increasing voltage is picked up and evaluated in order to fix the exhaust gas recirculation rate. At the same time, it is then recommended that non-volatile memory means be acted upon parallel to this by the increasing potential, which can be done without difficulty at specified times or in other words in stages, so that when the engine is turned on again after being turned off the adjustment can be made based on a new base value corresponding approximately to the attained value. In this case the adjustment of the exhaust gas recirculation rate takes place quasi-continuously.

The preferred exemplary embodiment of the present invention will now be described in still greater detail, referring to the more detailed circuitry of FIG. 2 derived from the block circuit diagram of FIG. 1.

Figure 2:
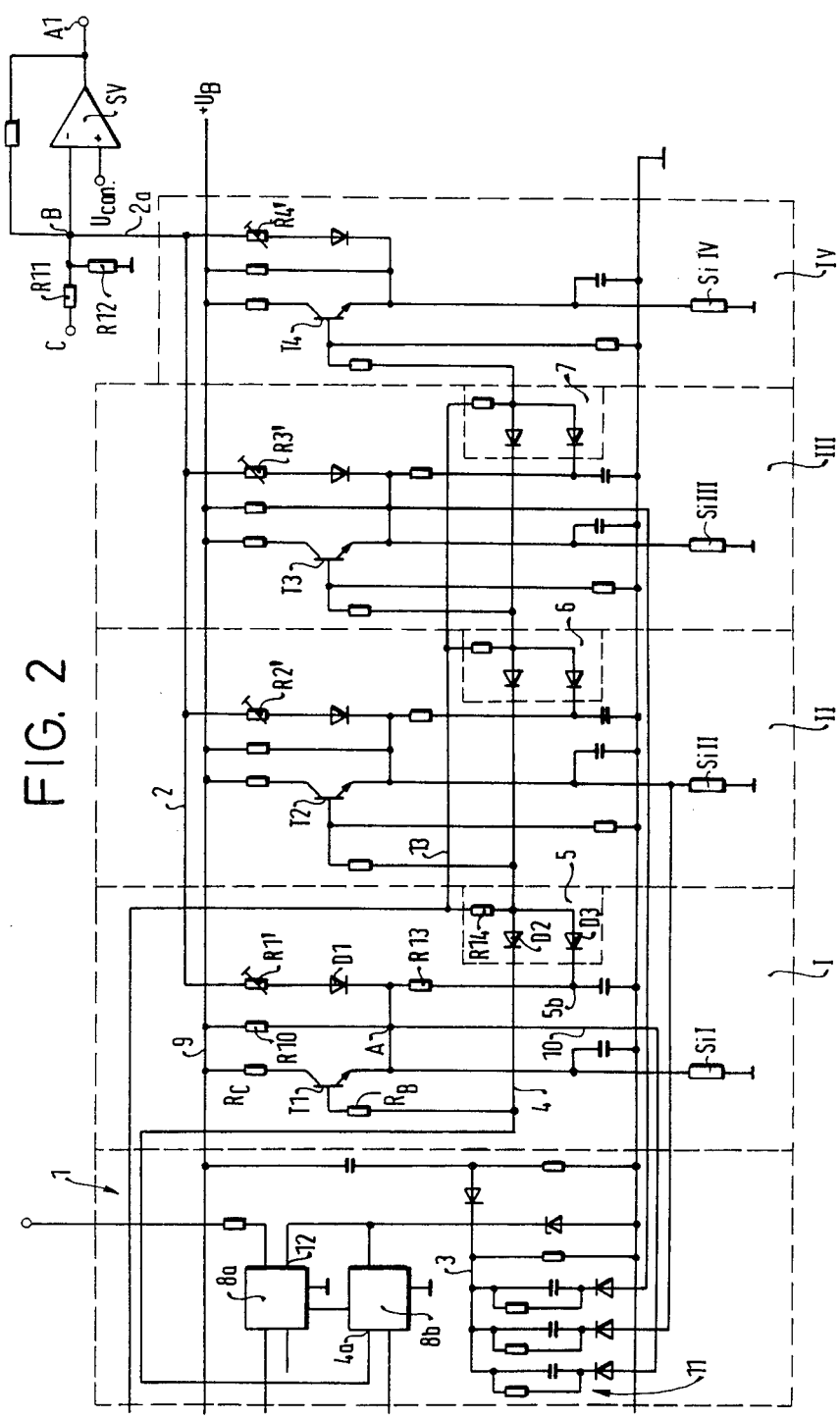
FIG. 2 shows the circuitry of the same system in more detail.

The four memory and switchover locations shown are again marked I–IV in FIG. 2. The individual circuit elements of the memory locations are repeated because they are embodied substantially identically; thus the circuit elements are individually provided with reference numerals only in the first memory location I and are identified individually in succeeding blocks only to the extent required for understanding the function sequence. Since the counter 1 for each stage, given a uniform distribution over time, must perform a relatively high number of counting processes, it is made up of two individual, operationally connected, integrated circuits 8a and 8b. The bus line carrying a given switchover control pulse from the output 4a of the counter to the individual memory locations I–IV is again identified as 4. Each memory location includes a circuit element receiving the switchover control pulse and causing the burnout of the respective associated fuse SiI–SiIV, this circuit element being embodied as a transistor, specifically as a Darlington power transistor T1–T4. The connection of the individual memory locations I–IV is effected such that the power switching transistors T1–T4 are connected with their collectors via a resistor $R_C$ to an upper line 9, for instance carrying positive supply voltage ($+U_B$), and with their emitter are connected to ground via the respective fuse SiI–SiIV associated with that memory position. Via a further resistor R10 the emitter of each switching transistor is also connected to the positive voltage bar, so that taking into consideration a resultant flow of current via R10 and the respective fuse SiI–SiIV, with the switching transistor blocked at circuit point A, a predetermined voltage results, which is specifically highly negative and practically corresponds to ground potential; this voltage leads via a diode D1 blocking in the opposite direction and via a respective weighting resistor R1' to the output bus line 2, to which the other weighting resistors R2'–R4' are also connected. The result thus far is a parallel circuit, via the various fuses SiI–SiIV, of the weighting resistors R1'–R4' connected to the output bus line 2 and the transmission of a potential which at first is correspondingly highly negative to an output circuit point B, which may simultaneously be one input of a following summing amplifier SV. A constant voltage $U_{const}$ is supplied to the other input, perhaps via a reference voltage divider, not shown. If the circuit point B at which the output voltage of the electronic running time circuit shown in FIG. 2 for the adjustment of the exhaust gas recirculation rate is applied corresponds to the junction of a voltage divider circuit comprising R11, R12, which conventionally forms an input C for the exhaust gas recirculation setting to be performed normally, then the result at the output A1 of the summing amplifier is the combination signal for the exhaust gas recirculation rate adjustment.

If the base of the switchover transistor of the particular memory location triggered at a predetermined time is reached by the triggering control pulse via a base resistor $R_B$, which in the illustrated exemplary embodiment is a positive voltage jump, then the thus-far blocked switching transistor, which therefore has not intervened in the determination of the potential at circuit point A, is briefly made conductive and thereby draws a current such that the associated fuse SiI, SiII . . . disposed in the emitter circuit burns out. Thus the circuit point A loses its negative ground connection and its potential immediately jumps to a comparatively high positive potential. At this point, it should be noted that the positive or negative voltage potentials or pulse course mentioned here and below do not limit the scope of the invention in this sense but instead are to be understood purely as examples, since if circuit elements of the opposite type are used, naturally the polarity distribution will be reversed accordingly.

The shift of potential in the direction of positive values at circuit point A when a given fuse burns out leads, via a reset line 10 with a subsequent differentiating RC member 11, to the reset bus line 3 and from there to the reset connection 12 of the counter 1, thus initiating a new counting cycle. At the same time, the diode D1 leading to the output bus line 2 blocks and thus takes its associated weighting resistor R1' out of the process of determining potential for the output connection B. A corresponding change occurs in the final output signal for determining the exhaust gas recirculation rate as well as the supplying via a further resistor R13 of a signal, which prepares the further transmission of the next triggering control pulse from the counter 1 to the next subsequent memory location II, to one input 5b of the next subsequent gate circuit 5, the other input of which is connected, in common with the other inputs of the subsequent gate circuits, to the trigger line 4. The gate circuits are made up of two diodes D2 and D3, interconnected at their anodes and representing the output of the gate circuit. Via a suitable bias resistor R14, a positive potential is also delivered on a further bus line 13 to the inputs of the memory and switchover locations, which positive potential always causes the switchover of the following memory locations II, III . . . after the first memory location I whenever the two diodes D2 and D3, poled in the direction of current flow counter to positive potential, of the AND gates 5, 6, 7 are no longer capable of holding the respective trigger point for the memory locations at a sufficiently negative potential.

The mode of operation for triggering the subsequent memory locations is therefor such that by taking away the negative potential at the input 5b of the next respective gate circuit 5, first the diode D3 blocks, and the blockage of the parallel diode D2 is then effected by means of the positive control pulse from the counter 1. At this instant, the positive potential at the control input or at the base of the power transistors prevails, so that these become conductive. In a corresponding manner, more and more memory locations are taken out of action in sequence so that they do not influence the output connection B, until after a predetermined period in operation has elapsed the influence of the running time electronics according to the invention upon the exhaust gas recirculation rate has been rescinded completely once again. It will also be understood that merely by replacing the fuses in the emitter circuits of the switchover and memory locations I, II . . . , the system can be returned once again to its functional status.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for controlling an exhaust gas recirculation rate in internal combustion engines, in particular Diesel engines, and in particular for compensating for operating conditions which affect proportions of a fuel-air mixture supplied at a given time and wherein said operating conditions are subjected to a process of alteration which fades with time, comprising the steps of,
   ascertaining a duration of operation up to a time when said altering process of said operating condition begins,
   generating triggering control pulses in response to said ascertaining step,
   adjusting said exhaust gas recirculation rate at fixed predetermined time intervals after the start-up of the engine in accordance with said ascertaining step, and
   simultaneously storing permanently an attained position value of an adjustment of said exhaust gas recirculation rate.

2. An apparatus for controlling an exhaust gas recirculation rate in internal combustion engines, in particular Diesel engines, and in particular for compensating for operating conditions which affect proportions of a fuel-air mixture supplied at a given time and wherein said operating conditions are subjected to a process of alteration which fades with time comprising,
   means for ascertaining operational duration time intervals from a time when said altering operating conditions begin,
   means resonsive thereto for generating triggering control pulses,
   sequentially connected memory and switchover means for receiving said control pulses and adjusting said exhaust gas recirculation rate and simultaneously storing permanently an attained position value of an adjustment position of said exhaust gas recirculation rate, wherein said ascertaining means comprises a counter for counting injection events, said switchover and memory means acting to burn out replaceable fuses upon receiving said control pulses, and at the same time produce a successive change in an output potential contributing to the determination of said exhaust gas recirculation rate and a resetting of said counter to a predetermined initial value.

3. An apparatus as defined by claim 2, wherein said switchover and memory means are triggerable in common, via linkage circuits by said counter, each said circuit having a respective second input for receiving a subsequent one of said triggering control pulses by means of the storage in memory of said exhaust gas recirculation rate adjustment position value attained at respective preceding ones of said sequentially connected switchover and memory means.

4. A method for controlling an exhaust gas recirculation rate in internal combustion engines, in particular Diesel engines, and in particular for compensating for operating conditions which affect proportions of a fuel-air mixture supplied at a given time and wherein said operating conditions are subjected to a process of alteration which fades with time, comprising the steps of,
   ascertaining a duration of operation up to a time when said altering process of said operating condition begins, and adjusting said exhaust gas recirculation rate at predetermined time intervals in accordance with said ascertaining step, wherein the ascertaining of said duration of operation is defined by predetermined operational duration intervals ascertained by counting injection events, and after an elapse of a predetermined number of injections a switchover control pulse is generated.

5. A method as defined by claim 4 wherein after the elapse of each of said predetermined operational duration time intervals, said adjustment of said exhaust gas recirculation rate effected in response thereto is permanently stored.

6. A method as defined by claim 5, wherein adjusting said exhaust gas recirculation compensates for said influence of carbonization of fuel injection nozzles in Diesel engines, and storing said adjusting simultaneously prepares the transmission of said triggering control pulse generated at a given switchover time for subsequent storage.

7. A method as defined by claim 5, wherein for the step of storing said exhaust gas recirculation rate adjustment at a given time, sequential fuses are burned out.

8. An apparatus for controlling an exhaust gas recirculation rate in internal combustion engines, in particular Diesel engines, and in particular for compensating for operating conditions which affect proportions of a fuel-air mixture supplied at a given time and wherein said operating conditions are subjected to a process of alteration which fades with time comprising, means for ascertaining operational duration time intervals from a time when said altering operating conditions begin, means responsive thereto for generating triggering control pulses, sequentially connected memory and switchover means for receiving said control pulses and adjusting at fixed predetermined values after the start-up of the engine said exhaust gas recirculation rate and simultaneously storing permanently an attained position value of an adjustment position of said exhaust gas recirculation rate.

9. An apparatus as defined by claim 8, wherein each switchover means includes a power switching transistor in a main switching path of which a fuse is disposed which burns out when said power transistor is switched to become conductive by means of said triggering pulse from said counter delivered respectively to each of said switchover and memory means, and wherein a ground connection to a circuit point is interrupted, and by means of the blockage of a following diode leading to an output bus line from said memory and switchover means having an associated weighting resistor means the influence of one of said switchover and memory means involved at that time upon an output potential is eliminated.

10. An apparatus as defined by claim 9, wherein said each of said switchover and memory means respectively comprise individual switching positions of an incremental switching element, which is indexed further by one switching increment at a time by said triggering control pulse of said counter, thereby resetting said counter, and simultaneously effecting a further respective adjustment in said exhaust gas recirculation rate.

11. An apparatus as defined by claim 10, wherein said further respective adjustment in said exhaust gas recirculation rate is effected by means of a change in potential based on a subsequent resistor network.

* * * * *